United States Patent
Uemoto et al.

(10) Patent No.: US 7,137,722 B2
(45) Date of Patent: Nov. 21, 2006

(54) MOTORCYCLE FRONT BODY STRUCTURE

(75) Inventors: Takumi Uemoto, Kobe (JP); Ryota Obuki, Kobe (JP); Nobumasa Taniguchi, Ono (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 114 days.

(21) Appl. No.: 11/050,938

(22) Filed: Feb. 4, 2005

(65) Prior Publication Data

US 2005/0174787 A1    Aug. 11, 2005

(30) Foreign Application Priority Data

Feb. 6, 2004 (JP) .............................. 2004-031282

(51) Int. Cl.
*F21W 101/027* (2006.01)

(52) U.S. Cl. ..................... 362/473; 362/373; 362/475

(58) Field of Classification Search ................ 362/473, 362/475, 476, 546, 547, 373
See application file for complete search history.

(56) References Cited

U.S. PATENT DOCUMENTS 4,515,405 A * 5/1985 Ogishima ................. 296/78.1
4,703,825 A * 11/1987 Mikami et al. ............. 180/229
5,330,029 A * 7/1994 Yoshimura et al. ......... 180/219

FOREIGN PATENT DOCUMENTS

JP        09-076968        3/1997

\* cited by examiner

*Primary Examiner*—Laura K. Tso (57) ABSTRACT

To provide a motorcycle front body structure of a simplified design, which contributes to reduction in motorcycle height and air resistance, by the employment of a dedicated removable cover for selectively opening and closing the access opening defined in an undersurface of the lamp unit, the motorcycle front body structure includes a fairing (21) having a lamp opening (21a), a lamp unit (23) positioned in the lamp opening (21a) and having an undersurface formed with an access opening (23c), and a cover (24) removably fitted to the lamp unit (23) for covering the access opening (23c). The lamp unit (23) and the cover (24) have respective undersurfaces exposed to an air flow passage (40) above a front wheel (3).

20 Claims, 12 Drawing Sheets

MOTORCYCLE FRONT BODY STRUCTURE

BACKGROUND OF THE INVENTION

1. Field of the Invention

The present invention generally relates to a motorcycle front body structure and, more particularly, to the motorcycle front body structure, in which a lamp unit is positioned at a relatively low level so that the height of the motorcycle can be reduced.

2. Description of the Prior Art

In the conventional motorcycle front body structure including a fairing or cowling, the lamp unit accommodating headlights and position lamps is positioned inside the lamp opening defined in a front surface portion of the fairing, with a lower center portion of the lamp unit completely covered by a bottom wall of the fairing. In order to facilitate the replacement of the position lamps in the lamp unit, it is known to provide an access opening in the bottom wall of the fairing, which is closed by a removable lid or cover and which when the cover is removed, an access to the position lamps in the lamp unit can be available. See, for example, the Japanese Patent No. 3465436.

It has, however, been found that with the conventional motorcycle front body structure discussed above, the lamp unit cannot be positioned at a sufficiently lower position in view of the presence of the bottom wall of the fairing beneath the lamp unit and, as a result, it has been difficult to reduce the motorcycle height and, also, the air resistance acting on the motorcycle. In particular, where the access opening is employed in combination with the lid such as disclosed in the above mentioned patent, a space or gap between the lamp unit and the bottom wall of the fairing must be increased, resulting in a difficulty in reducing the motorcycle height.

SUMMARY OF THE INVENTION

In view of the foregoing, the present invention is intended to provide a motorcycle front body structure of a simplified design, which contributes to reduction in motorcycle height and air resistance, by the employment of a dedicated removable cover for selectively opening and closing the access opening defined in an undersurface of the lamp unit.

In order to accomplish the foregoing object, the present invention provides a motorcycle front body structure, which includes a fairing having a lamp opening, a lamp unit positioned in the lamp opening and having an undersurface formed with an access opening, and a cover removably fitted to the lamp unit for covering the access opening. The lamp unit and the cover have respective undersurfaces exposed to an air flow passage above a front wheel.

According to the present invention, the undersurface of the lamp unit and the undersurface of the cover used to close the access opening are exposed to the air flow passage defined above the front wheel. This means that the fairing has no bottom wall. Accordingly, the lamp unit can be positioned at a relatively low level and the motorcycle height can be reduced consequently to thereby reduce the air resistance. Furthermore, the fairing can be of a simplified design. Also, since the access opening is covered by the removably fitted cover, the maintenance, for example, replacement of the position lamps, can easily be accomplished when the cover is removed to allow the attendant worker to make access to the lamp unit through the access opening.

In a preferred embodiment of the present invention, position lamps may be positioned at a portion of the lamp unit generally intermediate of a width of the fairing and in the vicinity of or confronting to the access opening, so that during the maintenance of the position lamps such as, for example, replacement and/or repair thereof, mere removal of the cover used to close the access opening leading to the position lamps allows the attendant worker to make access to the position lamps, resulting in increased workability.

In another preferred embodiment of the present invention, the undersurface of the cover may be formed with a guide surface so curved as to guide an air towards an radiator, so that during the cruising of the motorcycle, the air can be forcibly guided along the guide surfaces from front towards the radiator. This is particularly advantageous in that the air resistance can be reduced to increase the efficiency of guidance of the air toward the radiator.

In a further preferred embodiment of the present invention, a pair of cowl front members forming a part of the air flow passage may be fastened to the lamp unit and, at the same time, the cover may have engagement pieces formed therein for engagement with engagement pieces formed in respective inner ends of the cowl front members.

According to this structure, the pair of the cowl front members which are in practice positioned left and right with respect to the motorcycle front body structure, respectively, are connected with the lamp unit by fastening the cowl front members to the lamp unit and engaging the engagement piece formed in the corresponding inner ends of the cowl front members with the engagement pieces, formed in the cover. As the result, the number of connection points of the cowl front members employed can be reduced to thereby reduce the number of fastening members used and, also, the number of assembling steps.

In a still further preferred embodiment of the present invention, an engagement mechanism of the cover may be employed for allowing the cover to be removably slid relative to the lamp unit in a direction forwardly and rearwardly of a motorcycle. In such case, at least one fastening element may be employed for securing the cover to the ramp unit in an engaged condition. This is particularly advantageous in that a minimized number of fastening elements is sufficient to firmly connect the cover to the lamp unit.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Hereinafter, a preferred embodiment of the present invention will be described in detail with reference to the accompanying drawings.

Figure 1:
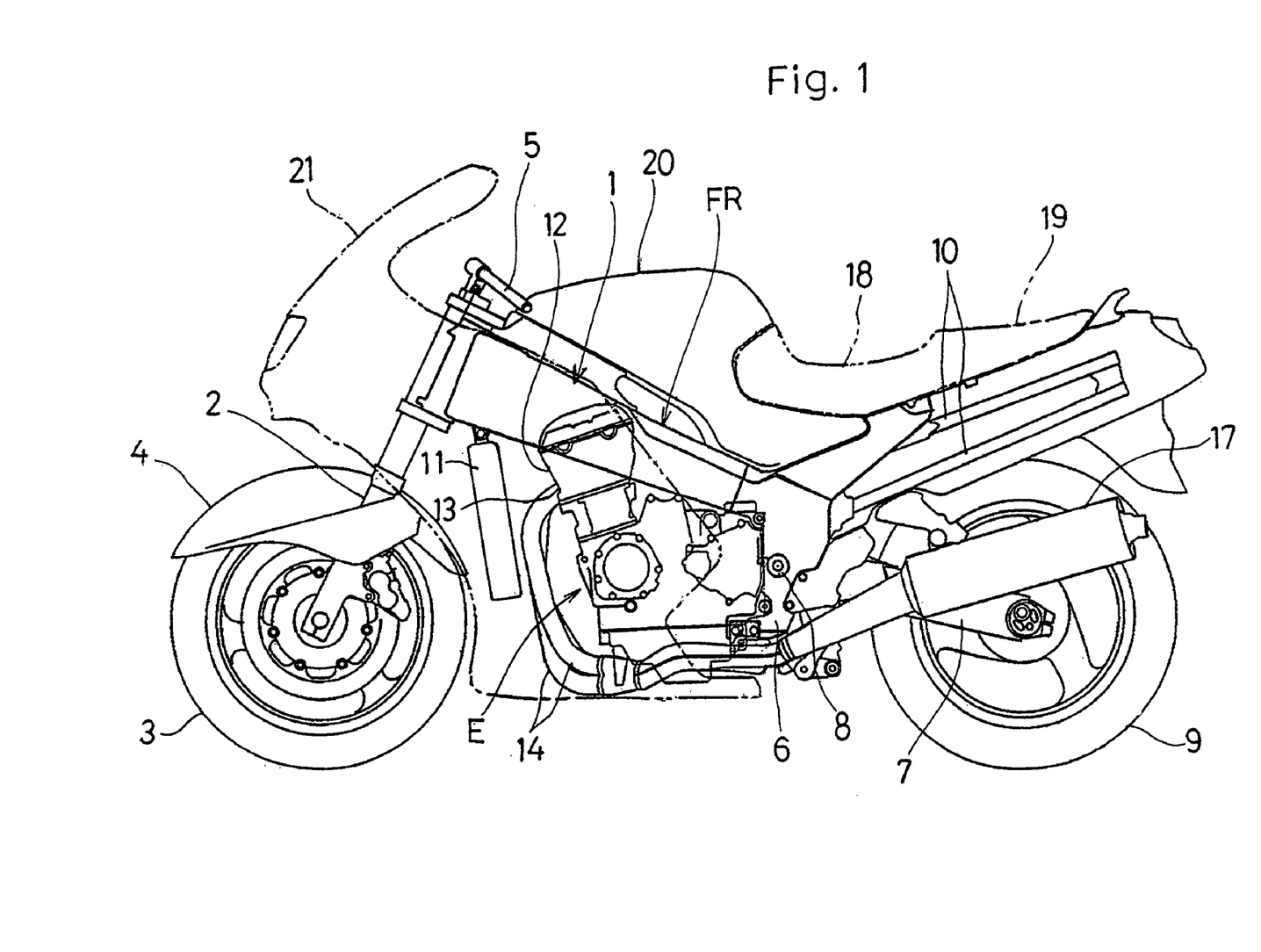
FIG. 1 is a side view of a motorcycle employing a front body structure according to a preferred embodiment of the present invention.

Referring now to FIG. 1, there is shown in a side view, a motorcycle employing a front body structure according to a the preferred embodiment of the present invention. The motorcycle shown therein includes a motorcycle frame structure FR having a main frame 1, forming a front portion of the motorcycle frame structure FR, and a pair of seat rails 10 forming a rear portion of the motorcycle frame structure FR and rigidly connected with a rear end portion of the main frame 1. The motorcycle further includes a front fork 2 pivotally supported by a front end portion of the main frame 1 and carrying a front wheel 3 at a lower end thereof and, also, a front fender or mudguard 4 fixedly supported thereby so as to overhang above the front wheel 3. A steering handlebar 5 is coupled with an upper end of the front fork 2 for movement together therewith.

The main frame 1 has a lower rear end formed with a swingarm bracket 6, to which a swingarm 7 rotatably carrying a rear wheel 9 at a location remote from the swingarm bracket 6 is connected by means of a pivot shaft 8 for movement up and down about the pivot shaft 8. A motorcycle combustion engine E is supported by the main frame 1 at a lower intermediate portion thereof and a radiator 11 for radiating heat from an engine coolant, for example, a liquid coolant used to cool the motorcycle combustion engine E is arranged forwardly of the engine E and rearwardly of the front wheel 3. An exhaust port 13 formed in an engine cylinder head 12 of the combustion engine E is fluidly connected with an exhaust tube 14 for emission therethrough of exhaust gases to the atmosphere by way of a silencer or muffler 17 disposed on the exhaust tube 14.

A rider's seat 18 and a seat 19 for a fellow passenger are mounted on the seat rails 10, and a fuel tank 20 is fixedly mounted on an upper portion of the main frame 1 between the handlebar 5 and the rider's seat 18. A fairing or cowling 21 made of a synthetic resin is mounted on the main frame 1 so as to cover an area forwardly of the handlebar 5 and areas laterally outwardly of the front portion of the main frame 1, with its rear portions terminating laterally outwardly and downwardly of the motorcycle engine E, as shown by the double-dotted line in FIG. 1.

Figure 2:
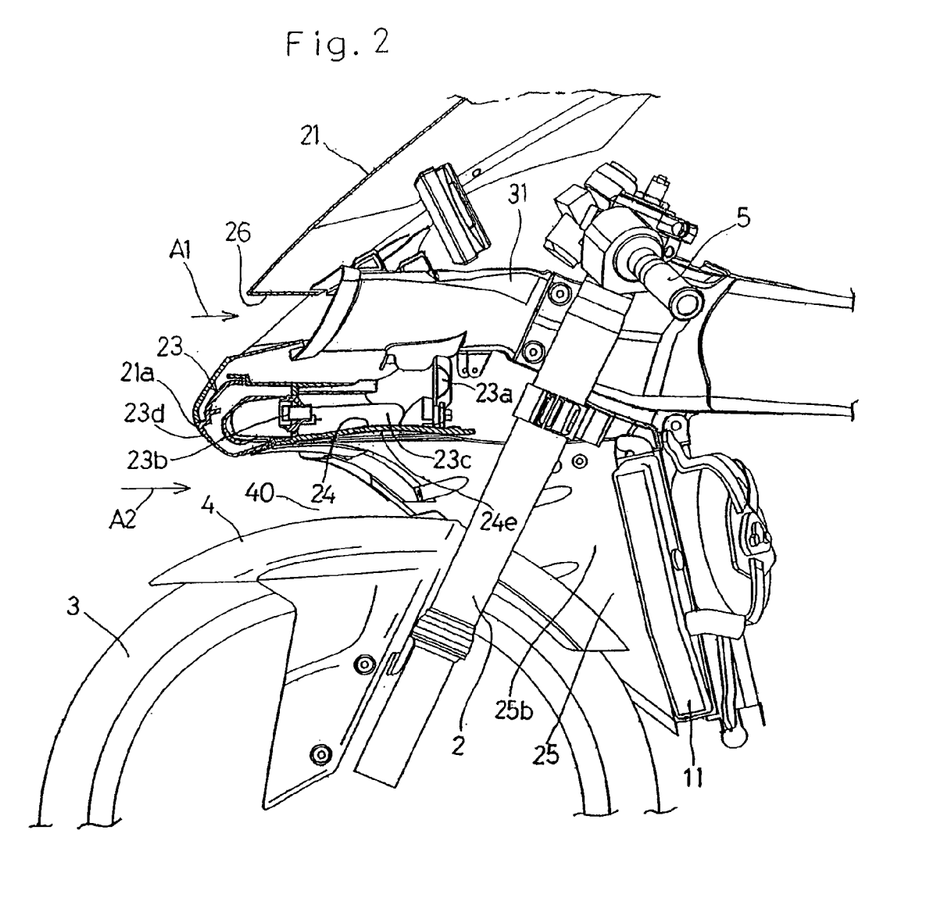
FIG. 2 is a side view, with a portion cut out, showing an essential portion of the front body structure on an enlarged scale.
Figure 3:
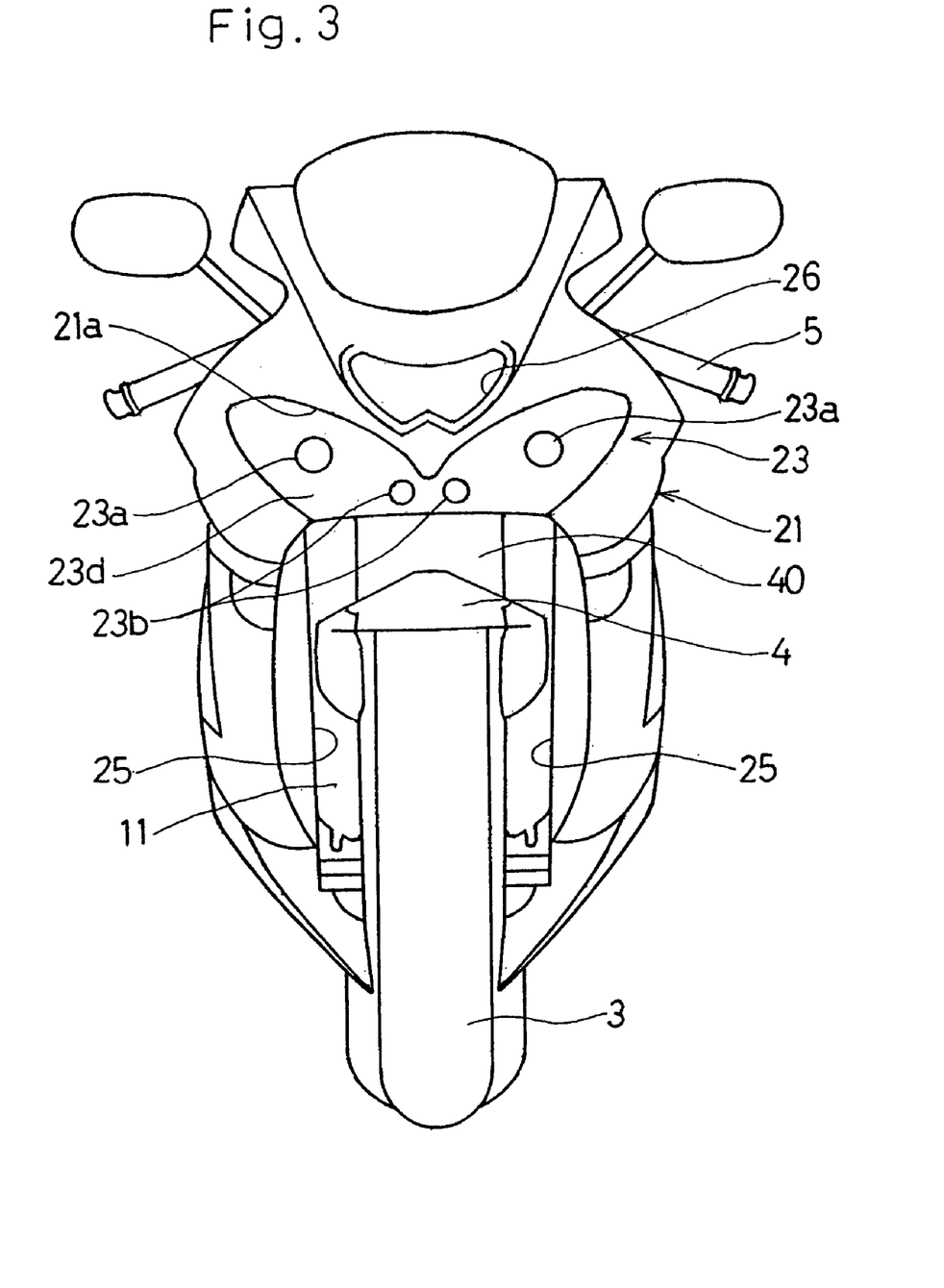
FIG. 3 is a front elevational view of the motorcycle shown in FIG. 1.

FIG. 2 illustrates a side view, with a portion cut out, showing an essential portion of the front body structure. As shown therein, the fairing 21 includes a front envelope and a pair of side envelopes with a lamp opening 21a defined in the front envelope. A lamp unit 23 is positioned inside the lamp opening 21a in the fairing 21. The lamp unit 23 accommodates therein left and right headlamps 23a and left and right position lamps 23b intervening between the left and right headlamps 23a as shown in FIG. 3. The lamp unit 23 shown in FIG. 2 also includes a shaped lens 23d of a configuration encompassing an area ranging from a front portion of the lamp unit 23 to a front lower portion thereof. An access opening 23c, as will be described later, is defined in a lower portion of the lamp unit 23 rearwardly of the lens 23d and is covered from below by a cover 24 that is detachably fitted to the lamp unit 23. With this construction, an undersurface of the lamp unit 23 and a corresponding undersurface of the cover 24 confront an air flow passage 40, defined above the front wheel 3, for introducing air to the radiator 11.

Left and right cowl front members 25 for delimiting the air flow passage 40 in cooperation with the cover 24 are fitted to the lamp unit 23 and the cover 24 with their rear portions positioned in the vicinity of the radiator 11. An air intake opening 26 is defined in a portion of the front envelope of the fairing 21 above the lamp unit 23, and an air A1 entering the air intake opening 26 can flow towards the motorcycle engine E through an intake duct 31 and be eventually introduced into the motorcycle engine E (FIG. 1) as a component of the combustible air/fuel mixture.

Figure 4:
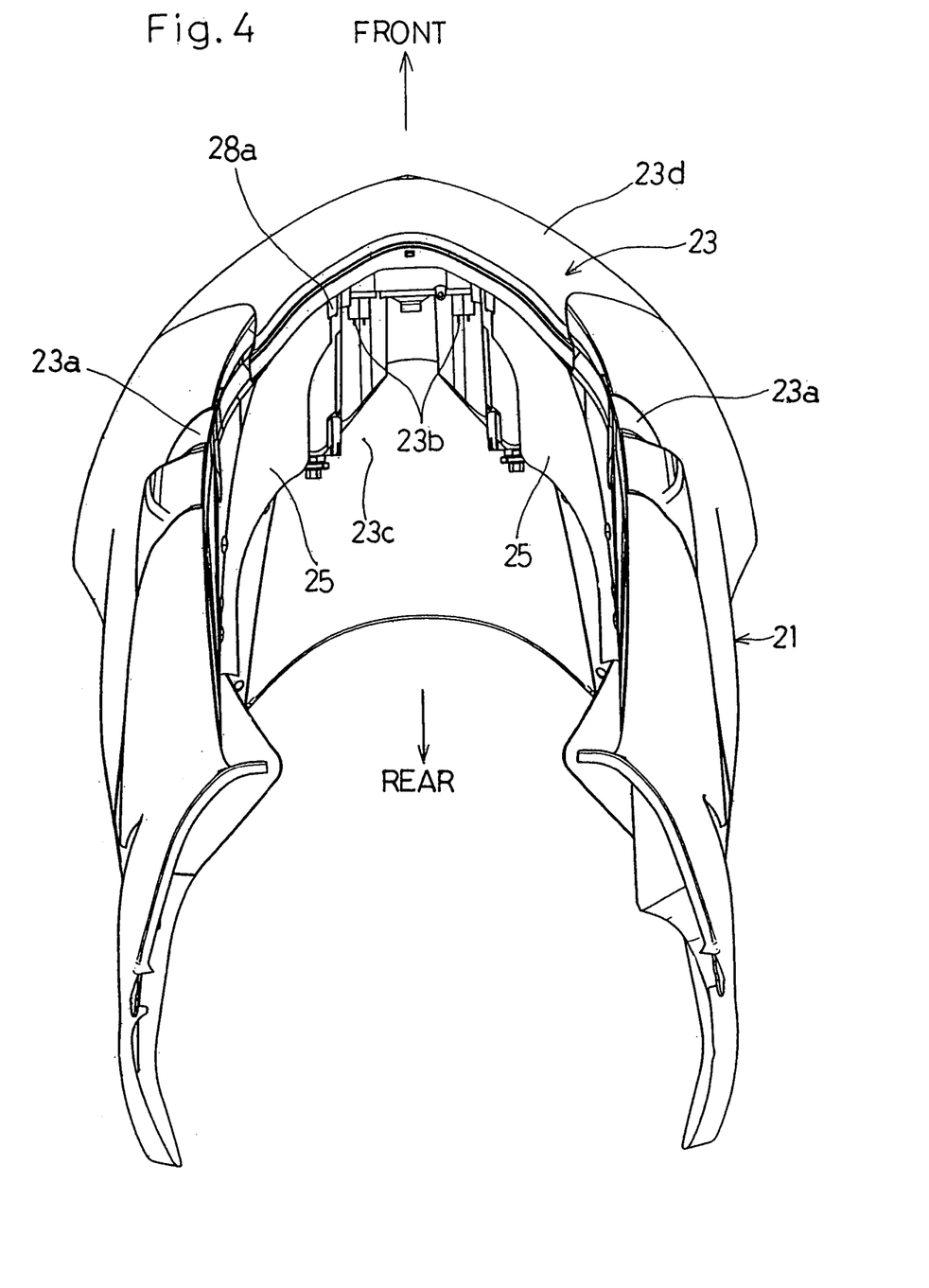
FIG. 4 is a bottom plan view, as viewed from below, of the front body structure with a cover removed.
Figure 5:
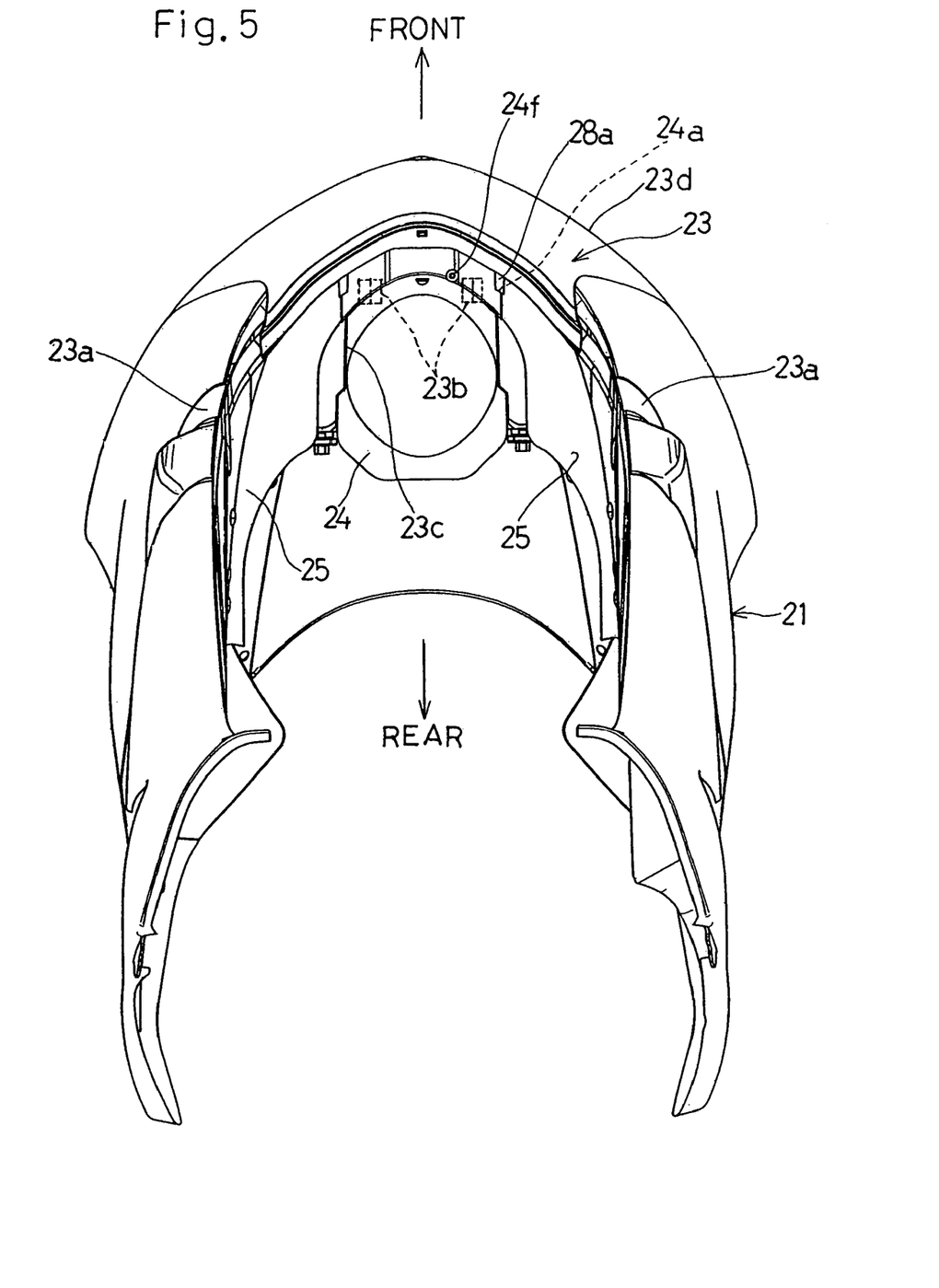
FIG. 5 is a bottom plan view, as viewed from below, of the front body structure with the cover fitted thereto.

FIG. 4 is a bottom plan view of the front body structure as viewed from below, with the cover 24 (FIG. 2) removed. As shown therein, the access opening 23c is in the form of a recess opening downwardly and rearwardly, with respective rear portions of the position lamps 23b positioned within such access opening 23c so that replacement or repair and/or maintenance of one or both of the position lamps 23b can be made through this access opening 23c. After the repair or maintenance, the cover 24 for covering the access opening 23c is fitted to the lamp unit 23 as shown in FIG. 5 so as to protect the position lamps 23b from dusts and rain.

Figure 6:
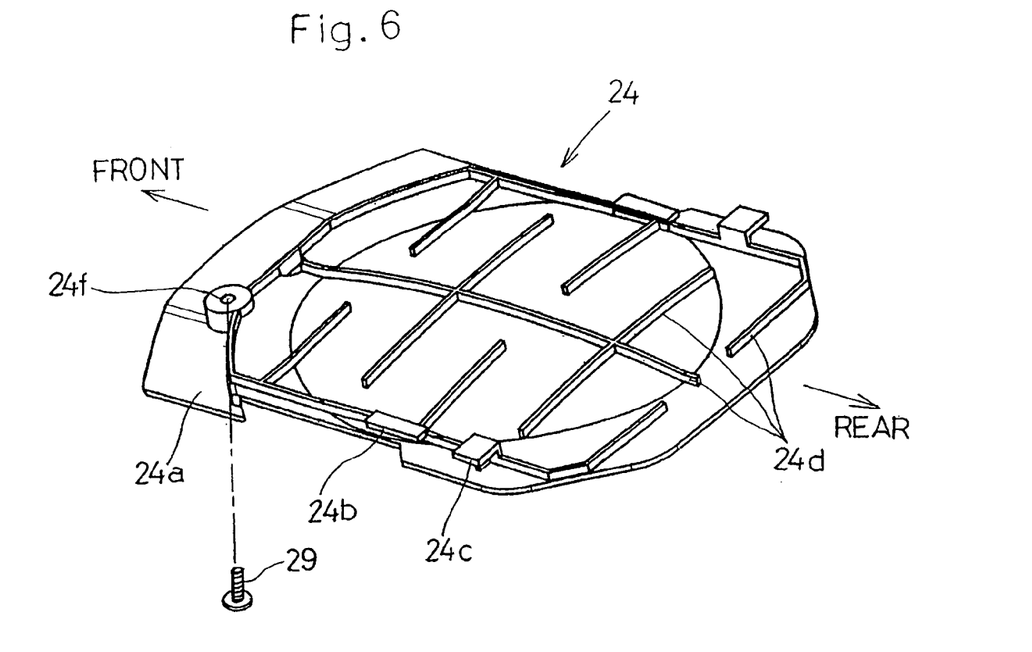
FIG. 6 is a perspective view, on an enlarged scale, showing the cover.
Figure 9:
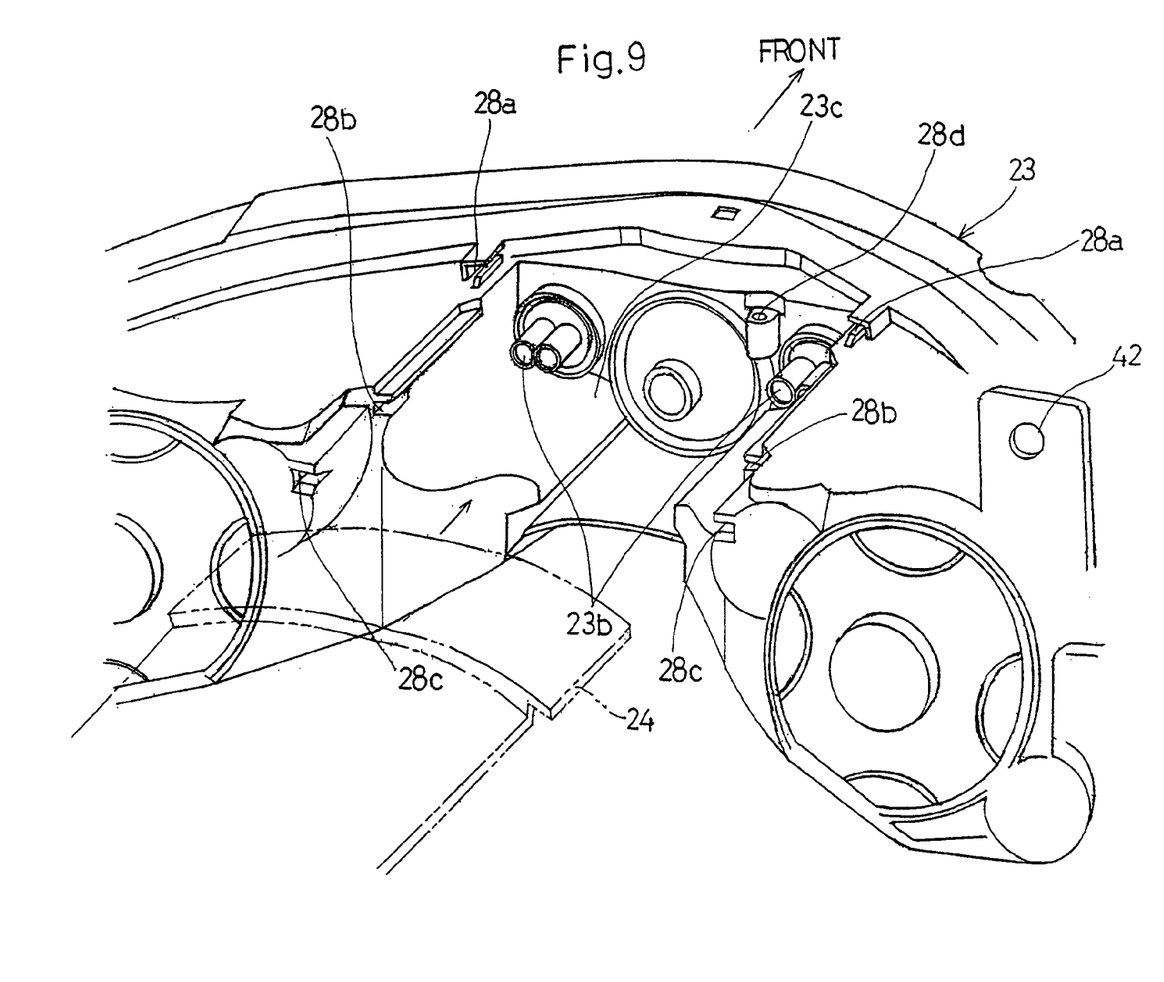
FIG. 9 is a fragmentary perspective view, showing an access opening on an enlarged scale.

Specifically, the cover 24 is fitted to the lamp unit 23 for sliding movement relative the access opening 23c between a closed position, in which the cover 24 closes the access opening 23c, and a removed position in which the cover 24 moves away to clear the access opening 23c. A slide engagement mechanism for positioning the cover 24 relative to the lamp unit 23 is employed in which, at the time of fitting, the cover 24 is slid in a forward direction relative to the access opening 23c (FIG. 5). The slide mechanism includes, as shown in FIG. 9, pairs of engagement grooves 28a, 28b and 28c, with one groove 28a, 28b or 28c and the other of each pair formed in respective opposite side walls of the lamp unit 23, which side walls define the access opening 23c, for cooperation with respective pairs of engagement pieces 24a, 24b and 24c formed in opposite side edges of the cover 24 as shown in FIG. 6. With the cover 24 mounted with the engagement pieces 24a to 24c slidingly engaged in the corresponding engagement grooves 28a to 28c, an insertion hole 24f defined in the cover 24 as shown in FIG. 6 is aligned with a screw hole 28d defined in the lamp unit 23, and then a screw 29, which is an example of a fastening element, is passed through such insertion hole 24f and threaded into such screw hole 28d to thereby fix the cover 24 to the lamp unit 23.

Figure 7:
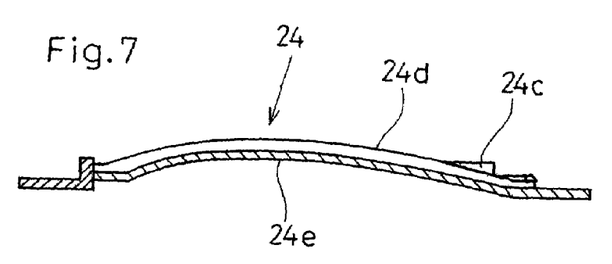
FIG. 7 is a longitudinal sectional view of the cover.
Figure 8:
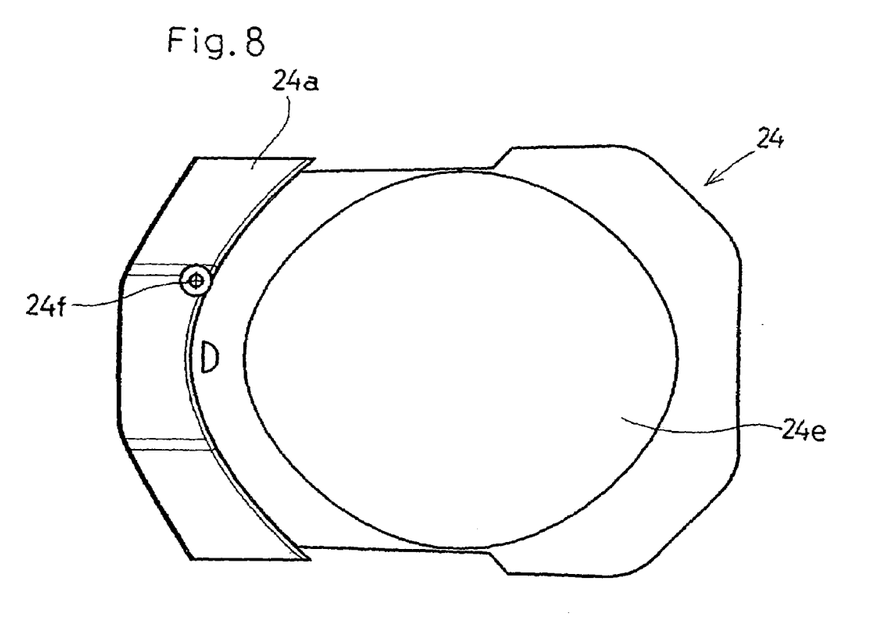
FIG. 8 is a bottom plan view of the cover.

As shown in FIG. 6, the cover 24 has an upper surface (an inner surface) formed with a matrix of reinforcement ribs 24d. Also, as shown in FIG. 7 in a longitudinal sectional representation, the upper surface of the cover 24 has a central portion moderately protruding upwardly, whereas the undersurface of the cover 24 opposite to the upper surface is upwardly depressed so as to render it to represent a curved guide surface 24e when the cover 24 is viewed from side. The guide surface 24e, when viewed from below as shown in FIG. 8, represents a generally oval or egg-like shape. When the undersurface of the cover 24 is so designed as to define the curved guide surface 24e as described above, an air A2 shown in FIG. 2 introduced through a space delimited between the lamp unit 23 and the fender 4 overhanging the front wheel 3 flows to the radiator 11 after having passed through the air flow passage 40 above the front wheel 3, that is, the air flow passage 40 delimited by an upper surface of the front wheel fender 4, the undersurfaces of the lamp unit 23 and the cover 24, and an inner surfaces 25b of the left and right cowl front members 25.

Figure 10:
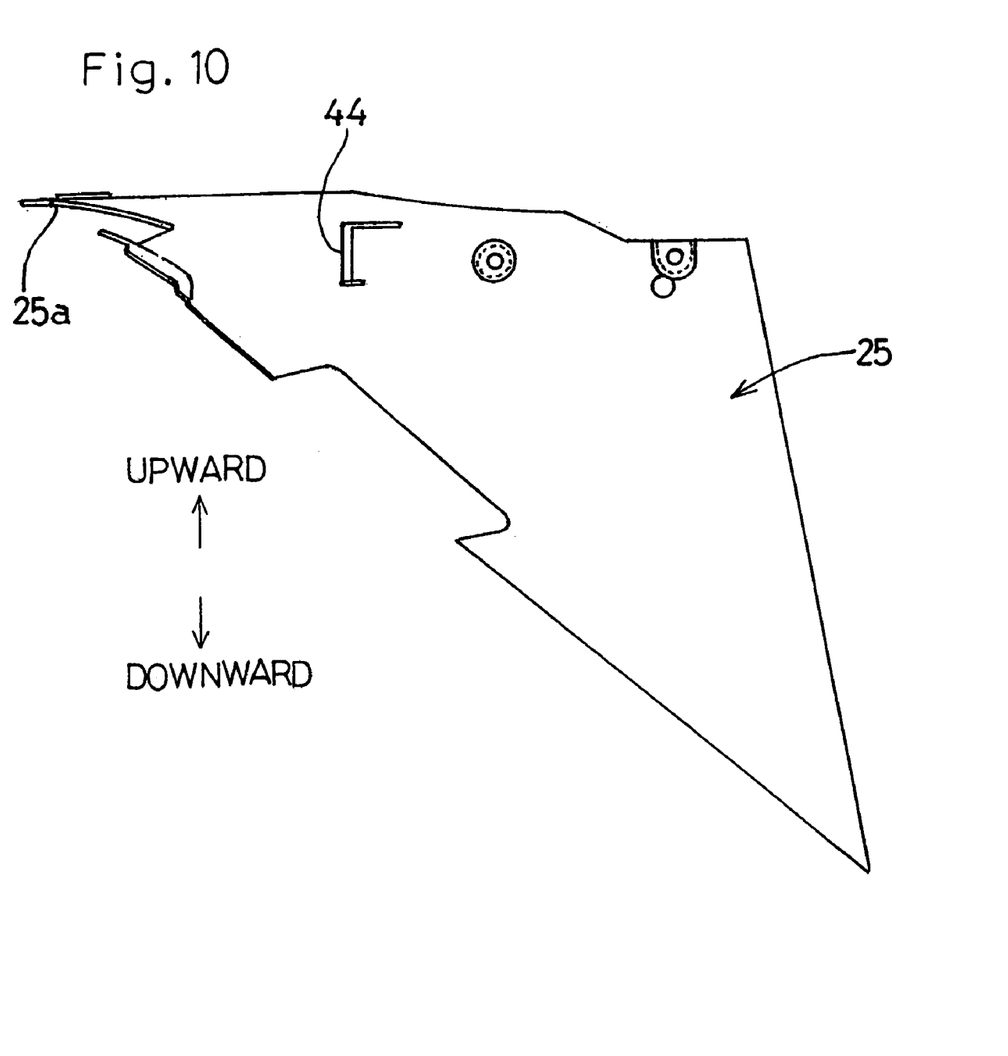
FIG. 10 is a side view, on an enlarged scale, showing a lamp unit and one of separate cowl front members.
Figure 11:
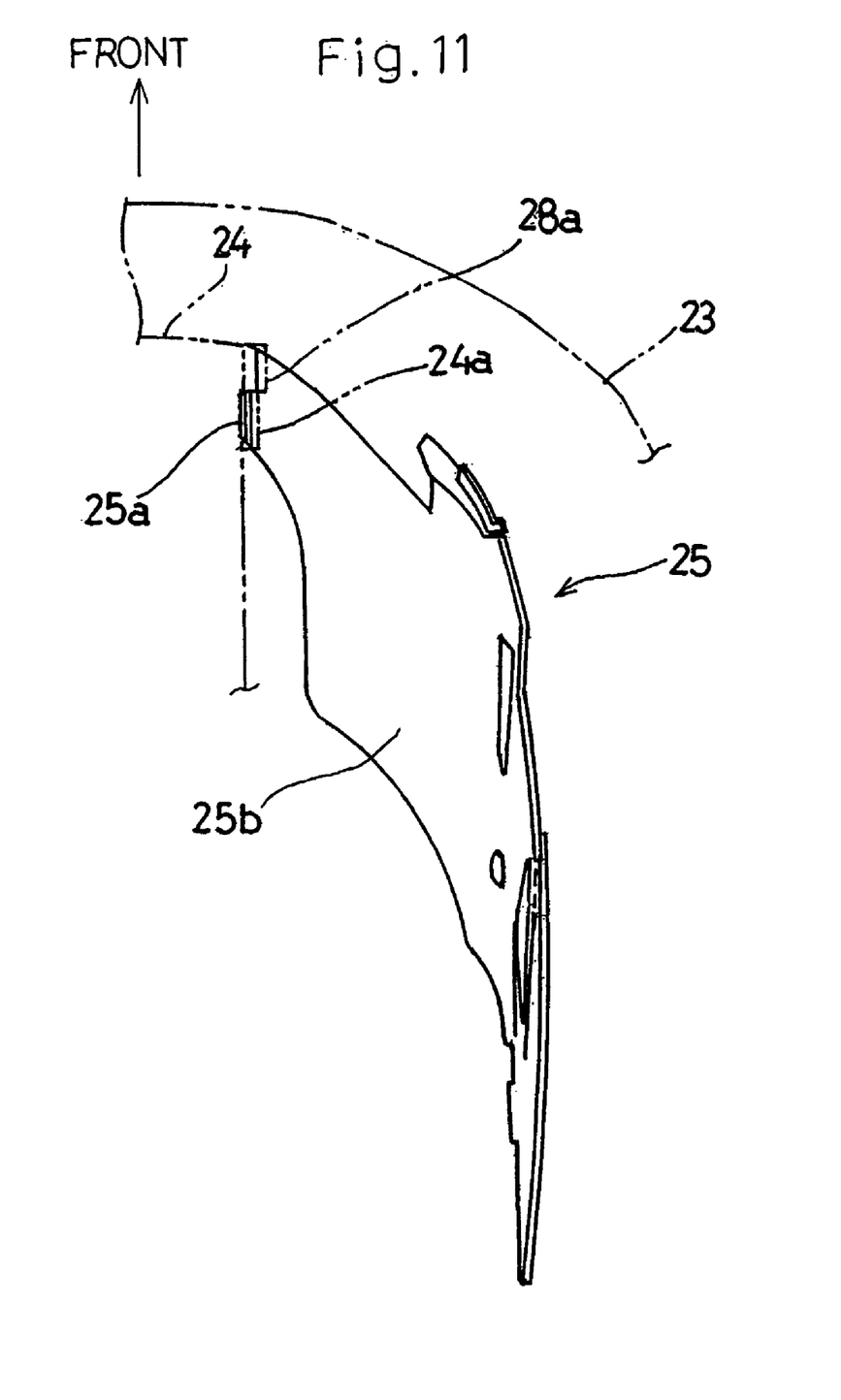
FIG. 11 is a bottom plan view showing the lamp unit and one of the separate cowl front members.
Figure 12:
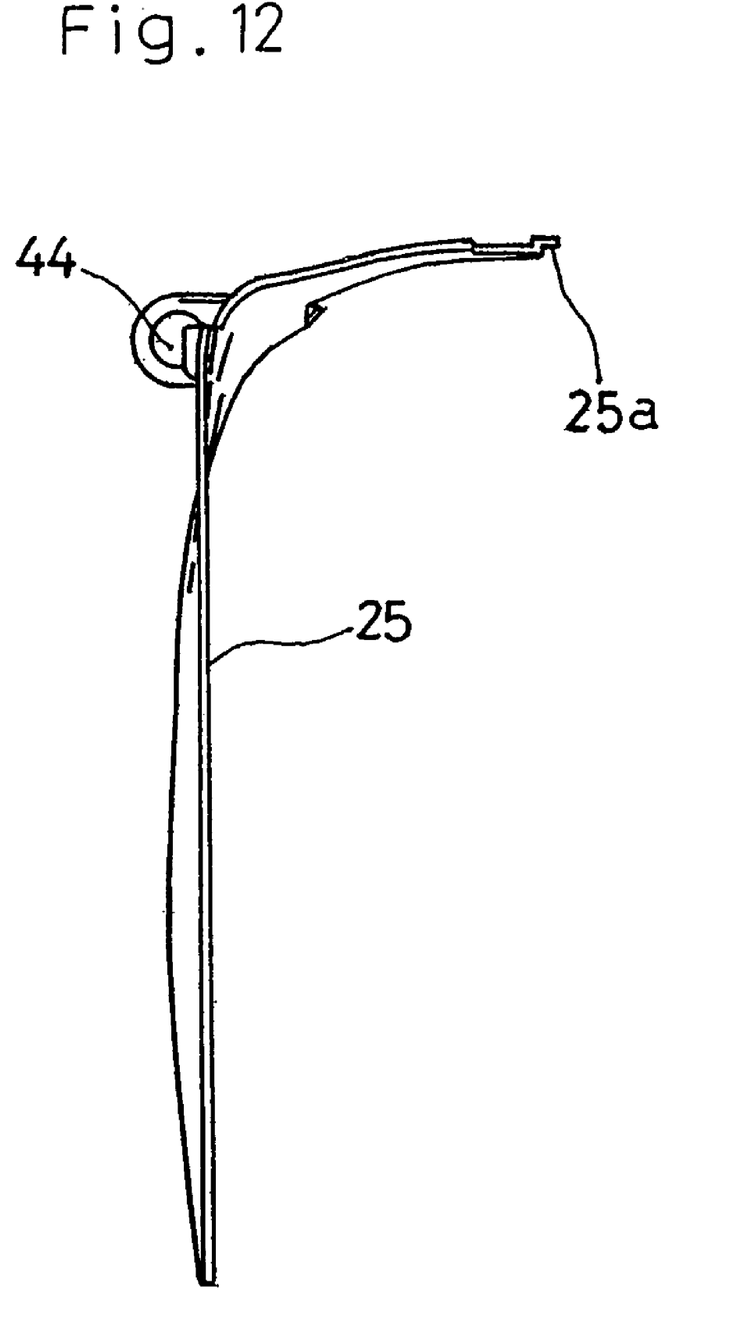
FIG. 12 is a rear view showing the lamp unit and one of the separate cowl front members.
Figure 13:
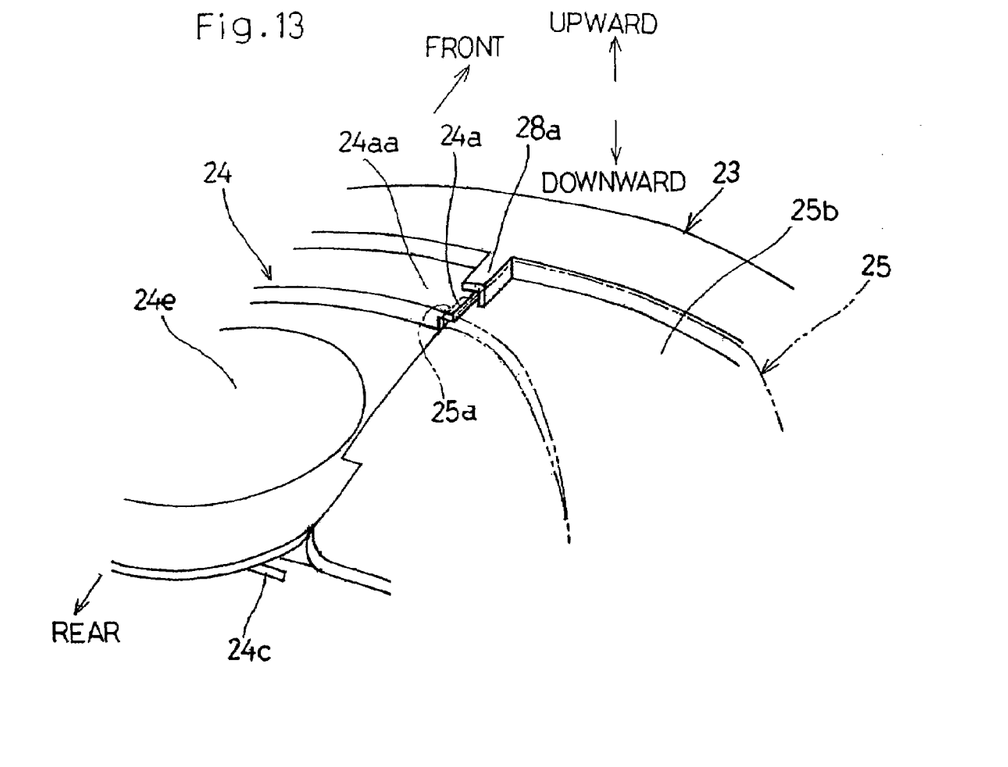
FIG. 13 is a perspective view, as viewed from below, showing the manner in which the lamp unit and the cowl front members are fitted.

FIG. 10 illustrates a side view of the lamp unit 23 (FIGS. 2 and 3) and one of the separate cowl front members 25 and, as shown in a bottom plan view in FIG. 11, an engagement piece 25a is provided in an inner portion of a tip of the respective cowl front member 25. This engagement piece 25a is, as shown in FIG. 13, supported in a manner sandwiched between the cover 24 and the lamp unit 23 at a location rearwardly of the first engagement groove 28a. More specifically, while the engagement pieces 24a of the cover 24 are engaged in the first engagement groove 28a of the lamp unit 23, the engagement pieces 25a of the cowl front member 25 are engaged with respective upper sides (lower sides as viewed in FIG. 13) of the engagement pieces 24a of the cover 24. With this arrangement the respective tips of the cowl front members 25 are supported by the lamp unit 23 while sandwiched between the cover 24 and the lamp unit 23. As shown in FIG. 13 showing in a perspective view as viewed from below, inner surfaces (lower surfaces) 25b of the cowl front members 25 and lower surfaces 24aa of the engagement pieces 24a are held in flush with each other. The left and right cowl front members 25 are fastened to the lamp unit 23 by means of bolts and nuts (not shown) inserted through mounting holes 42, defined in the lamp unit 23, as shown in FIG. 9, which have been aligned with mounting holes 44 in the cowl front members 25 as shown in FIG. 12 showing a rear view, respectively.

With the foregoing construction, the air resistance acting on the motorcycle body structure and the rider sitting during cruising of the motorcycle shown in FIG. 1 can be reduced by the fairing 21 as is well understood by those skilled in the art. As shown in FIG. 2, the air A2 is introduced into the radiator 11 through the air flow passage 40 present between the lamp unit 23 and the front wheel 3. Specifically, this air A2 flows along the curved guide surface 24e of the curve 24, then closing the access opening 23c in the undersurface of the lamp unit 23, before it is smoothly guided into the radiator 11. Accordingly, the air resistance can advantageously be reduced and the efficiency of guidance of the air towards the radiator 11 can also be increased.

Considering that the undersurface of the front portion of the lamp unit 23 and the undersurface of the cover 24 used to close the access opening 23c are exposed in the air flow passage 40 downwardly towards the front wheel 3 to define the air guide passage and, in other words, a bottom wall of the fairing 21 is dispensed with, the lamp unit 23 can be arranged at a lower position and, hence, the motorcycle height can be lowered, contributing to reduction of the air resistance. Furthermore, the fairing 21 can be of a simplified design.

Also, the cowl front members 25 shown in FIG. 13 (only one of which is shown) are fastened to the undersurface of the lamp unit 23 and secured to the lamp unit 23 with the engagement pieces 25a of the cowl front members 25 engaged with the engagement pieces 24a of the cover 24, not only can the number of mechanical connection points of the cowl front member 25 be reduced to thereby reduce the number of fastening elements used, but also the number of assembling steps can be reduced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A motorcycle front body structure, which comprises:
a fairing having a lamp opening;
a lamp unit positioned in the lamp opening and having an undersurface formed with an access opening; and
a cover removably fitted to the lamp unit for covering the access opening;
respective undersurfaces of the lamp unit and the cover being exposed to an air flow passage above a front wheel.

2. The motorcycle front body structure as claimed in claim 1, further comprising position lamps positioned at a portion of the lamp unit generally intermediate of a width of the fairing and in the vicinity of the access opening.

3. The motorcycle front body structure as claimed in claim 1, wherein the undersurface of the cover is formed with a guide surface so curved as to guide an air towards an radiator.

4. The motorcycle front body structure as claimed in claim 1, further comprising a pair of cowl front members fastened to the lamp unit and forming a part of the air flow passage, and the cover has engagement pieces formed therein for engagement with engagement pieces formed in respective inner ends of the cowl front members.

5. The motorcycle front body structure as claimed in claim 1, further comprising an engagement mechanism for allowing the cover to be removably slid relative to the lamp unit in a direction forwardly and rearwardly of a motorcycle.

6. The motorcycle front body structure as claimed in claim 5, further comprising at least one fastening element for securing the cover to the lamp unit in an engaged condition.

7. A motorcycle fairing comprising;
a cowling body for attachment to a motorcycle having a first opening with an air passageway for providing intake air to an engine and a second opening with an air passageway for providing air to a radiator; and
a lamp unit mounted in the cowling body between the first opening and the second opening.

8. The motorcycle fairing of claim 7 further including position lamps positioned at a portion of the lamp unit approximately intermediate of a width of the cowling body and in the vicinity of the second opening.

9. The motorcycle fairing of claim 7 further including a cover removably fitted to the lamp unit and forming an air guiding surface downstream the second opening in the cowling body to assist in directing air to the radiator.

10. The motorcycle fairing of claim 9 further comprising a pair of cowl front members fastened to the lamp unit and forming a part of the air flow passage, wherein the cover has engagement pieces formed therein for engagement with engagement pieces formed in respective inner ends of the cowl front members.

11. The motorcycle fairing of claim 10, further comprising an engagement mechanism for allowing the cover to be removably slid relative to the lamp unit in a direction forwardly and rearwardly.

12. The motorcycle fairing of claim 11, further comprising at least one fastening element for securing the cover to the lamp unit in an engaged condition.

13. The motorcycle of claim 9 wherein the cowling body further includes a pair of cowl front members that are fastened to an undersurface of the lamp unit.

14. The motorcycle fairing of claim 13 wherein the second air passageway is defined between the pair of cowl front members, an undersurface of the cover and a front fender of the motorcycle.

15. A motorcycle front body structure, which comprises:
a fairing having a lamp opening;
a lamp unit positioned in the lamp opening and having an undersurface formed with an access opening; and
a cover removably fitted to the lamp unit for covering the access opening and shaped to direct air, wherein respective undersurfaces of the lamp unit and the cover form with the fairing an air flow passage above a front wheel.

16. The motorcycle front body structure as claimed in claim 15, further comprising position lamps positioned at a portion of the lamp unit generally intermediate of a width of the fairing and in the vicinity of the access opening.

17. The motorcycle front body structure as claimed in claim 15, wherein the undersurface of the cover is formed with a guide surface curved to guide air towards an radiator.

18. The motorcycle front body structure as claimed in claim 15, further comprising a pair of cowl front members fastened to the lamp unit and forming a part of the air flow passage, and the cover has engagement pieces formed therein for engagement with engagement pieces formed in respective inner ends of the cowl front members.

19. The motorcycle front body structure as claimed in claim 15, further comprising an engagement mechanism for allowing the cover to be removably slid relative to the lamp unit in a direction forwardly and rearwardly of a motorcycle.

20. The motorcycle front body structure as claimed in claim 19, further comprising at least one fastening element for securing the cover to the lamp unit in an engaged condition.

* * * * *